US005763976A

United States Patent [19]
Huard

[11] Patent Number: 5,763,976
[45] Date of Patent: Jun. 9, 1998

[54] STATOR WOUND RESOLVER WITH STAGGERED ROTOR

[75] Inventor: Steven R. Huard, New Market, N.H.

[73] Assignee: Parker-Hannifin Corp., Cleveland, Ohio

[21] Appl. No.: 843,789

[22] Filed: Apr. 21, 1997

Related U.S. Application Data

[63] Continuation of Ser. No. 167,509, Dec. 15, 1993, abandoned.

[51] Int. Cl.⁶ .......................... H02K 19/24; H01F 21/06
[52] U.S. Cl. .......................... 310/168; 310/169; 310/170; 310/114; 310/262; 310/261; 310/264; 310/265; 310/268; 310/179; 310/111; 336/156; 318/605; 318/661; 29/598
[58] Field of Search .......................... 310/168–170, 310/114, 254, 261, 262, 264, 265, 179, 268, 111; 29/598; 318/701, 661, 605; 336/156, 155

[56] References Cited

U.S. PATENT DOCUMENTS

| | | | |
|---|---|---|---|
| 2,589,999 | 3/1952 | Feiertag et al. | 172/275 |
| 2,866,913 | 12/1958 | Kronacher | 310/111 |
| 2,871,433 | 1/1959 | Wargo | 318/166 |
| 2,982,872 | 5/1961 | Fredrickson | 310/163 |
| 3,514,650 | 5/1970 | Caywood, Jr. | 310/168 |
| 3,535,604 | 10/1970 | Madsen et al. | 318/138 |
| 3,641,467 | 2/1972 | Ringland et al. | 336/5 |
| 4,086,533 | 4/1978 | Ricouard et al. | 324/208 |
| 4,210,891 | 7/1980 | Boushey | 336/135 |
| 4,255,682 | 3/1981 | Toida et al. | 310/168 |
| 4,267,497 | 5/1981 | Cannon et al. | 318/661 |
| 4,489,266 | 12/1984 | Franzolini | 318/801 |
| 4,504,755 | 3/1985 | Semones et al. | 310/156 |
| 4,551,708 | 11/1985 | Welburn | 340/347 SY |
| 4,568,865 | 2/1986 | Welburn | 318/661 |
| 4,604,575 | 8/1986 | Shimizu | 336/135 |
| 4,631,510 | 12/1986 | Nagarkatti et al. | 336/135 |
| 4,687,961 | 8/1987 | Horber | 310/186 |
| 4,739,201 | 4/1988 | Brigham et al. | 310/49 R |
| 4,743,786 | 5/1988 | Ichikawa et al. | 310/111 |
| 4,755,702 | 7/1988 | Iijima et al. | 310/166 |
| 4,772,815 | 9/1988 | Harned et al. | 310/171 |
| 4,794,511 | 12/1988 | Lundin | 363/156 |
| 4,797,592 | 1/1989 | England | 310/154 |
| 4,870,358 | 9/1989 | Glaize et al. | 324/208 |
| 4,994,702 | 2/1991 | Arita | 310/254 |
| 5,039,897 | 8/1991 | Iwamatsu | 310/261 |
| 5,410,200 | 4/1995 | Sakamoto | 310/49 R |

FOREIGN PATENT DOCUMENTS 2-123936A  5/1990  Japan ........................... 310/166

Primary Examiner—Thomas M. Dougherty
Assistant Examiner—Karl Imayoshi E. Tamai
Attorney, Agent, or Firm—Calfee, Halter & Griswold LLP

[57] ABSTRACT

A stator wound resolver comprising: a stator and a rotor aligned on an axis; the stator having a plurality of teeth with input and output windings disposed on some or all of the teeth, the input and output windings exhibiting a mutual inductance characteristic that varies as a function of position of the rotor about the axis; the input winding being connectable to a drive signal and the output windings being disposed on the teeth such that output signals induced in the output windings correspond to position of the rotor; the rotor being attachable to a position changing means, the rotor comprising at least two axially spaced rotor pieces that are offset from each other by a stagger angle such that a portion of harmonic distortion produced by one of the rotor pieces is reduced by complementary harmonic distortion produced by another of the rotor pieces.

16 Claims, 5 Drawing Sheets

STATOR WOUND RESOLVER WITH STAGGERED ROTOR

This application is a continuation of application Ser. No. 08/167,509 filed on Dec. 15, 1993 now abandoned.

BACKGROUND OF THE INVENTION

The invention relates generally to stator wound resolvers. More particularly, the invention relates to reducing harmonic distortion in the output signals of stator wound resolvers.

Stator wound resolvers are commonly used in applications where it is desired to avoid the use of rotor windings, slip rings, limited rotor rotation or rotary transformers. A typical stator wound resolver includes a ferromagnetic stator made of a plurality of stacked laminations. The stator is usually cylindrical in shape, and the laminations are cut to provide a plurality of stator teeth that project inwardly from the back iron or yoke along radial lines towards the axial center of the stator. Each stator tooth carries one or more windings including input windings and output windings.

Depending on the resolver design, including the number of teeth, some of the teeth may be empty (i.e. no windings).

As is known, each winding exhibits a self-inductance characteristic, and also a mutual inductance characteristic with each other winding to which it is magnetically coupled.

These inductances are a function of the rotational position or movement of the rotor. A stator wound resolver rotor does not have windings. Typically, the rotor contour is selected so as to vary the mutual coupling between windings in a sinusoidal manner. The resolver output is basically derived by using an input excitation signal to an input winding on the stator, and detecting the output signals from one or more output windings, also on the stator, which output signals vary with the rotor position in a manner defined by the shape of the rotor. Movement of the rotor causes the mutual inductances between the input and output windings to vary in a predictable manner such that the output signals are indicative of the rotational displacement of the rotor.

The rotor is typically a solid contoured ferromagnetic structure made up of a series of stacked and cut ferromagnetic laminations or a solid ferrite core. The rotor is concentrically disposed within the stator on the central rotational axis. The rotor can be attached to a rotational drive member, such as for example, a motor, rotary actuator and so on, such that the resolver produces an output related to the rotational position of the rotor and hence the drive member.

Failure to strictly control the rotor and stator contours, as well as to control the precise placement of the winding wires on the stator poles, results in non-sinusoidal mutual inductance functions. Such non-sinusoidal coupling results in harmonic distortions that limit the overall accuracy of the resolver.

Prior attempts to improve stator wound resolver accuracy have focussed on optimizing the rotor contour. For example, in U.S. Pat. No. 2,866,913 issued to Kronacher, although the problem of non-sinusoidal mutual coupling is recognized, the Kronacher design attempts to improve accuracy by incorporating a skew into the rotor, rather than careful contouring of the rotor. Although the rotor skew technique can improve resolver performance by reducing harmonic distortion caused by non-sinusoidal mutual coupling, the technique is limited because the rotor skew causes magnetic flux to flow out of the plane that is perpendicular to the rotor axis. This axially flowing flux reduces the extent to which harmonic cancellation can be achieved. Also, the method does not address the fact that stator shape can effect the mutual coupling harmonics. Also, a precise non-linear skew is difficult to manufacture.

In U.S. Pat. No. 3,641,467, issue to Ringland, a different input excitation approach is used with phase modulation as distinguished from amplitude modulated resolvers such as the Kronacher patent. In essence, Ringland attempts to reduce harmonic distortion by reducing mutual coupling effects between the sine and cosine input phases. This is accomplished by using two independently wound stators one energized with sine and the other with cosine. While this may achieve improved results, the same result could have been achieved by using input current sources rather than voltage sources to drive the input phases. Also, choosing an amplitude modulated mode of operation rather than a phase modulated mode would have also eliminated the sine/cosine coupling effects. The Ringland design also does not solve the problems caused by non-sinusoidal mutual inductance coupling.

Other attempts at improving the sinusoidal mutual inductance have focussed on the rotor contour. These approaches are less than optimal, however, because they fail to take into account the fact that an optimum rotor contour is a function of the stator slot width, winding positions, fringing effects and the minimum/maximum air gap widths between the rotor and stator.

The objectives exist, therefore, for a stator wound resolver design that exhibits substantially reduced harmonic distortion resulting in a high accuracy resolver.

SUMMARY OF THE INVENTION

In response to the aforementioned problems and objectives, the invention contemplates in one embodiment a stator wound resolver comprising: a stator and a rotor aligned on an axis; the stator having a plurality of teeth with input and output windings disposed on some or all of the teeth, the input and output windings exhibiting a mutual inductance characteristic that varies as a function of position of the rotor about the axis; the input winding being connectable to a drive signal and the output windings being disposed on the teeth such that output signals induced in the output windings correspond to position of the rotor; the rotor being attachable to a position changing means, the rotor comprising at least two axially spaced rotor pieces that are offset from each other by a stagger angle such that a portion of harmonic distortion produced by one of the rotor pieces is reduced by complementary harmonic distortion produced by another of the rotor pieces.

The invention also contemplates methods for reducing harmonic distortion in the output signals of a stator wound resolver comprising the steps of:

a. using a first rotor that has a radius that varies in a sinusoidal manner to vary mutual inductance between input and output windings on the stator as a function of the rotor position; and b. using a second rotor that is axially spaced from the first rotor and offset by a stagger angle to produce complementary harmonic signals that reduce harmonic components in the resolver output signals.

These and other aspects and advantages of the present invention will be readily understood and appreciated by those skilled in the art from the following detailed description of the preferred embodiments with the best mode contemplated for practicing the invention in view of the accompanying drawings.

DETAILED DESCRIPTION OF THE INVENTION

Figure 1:
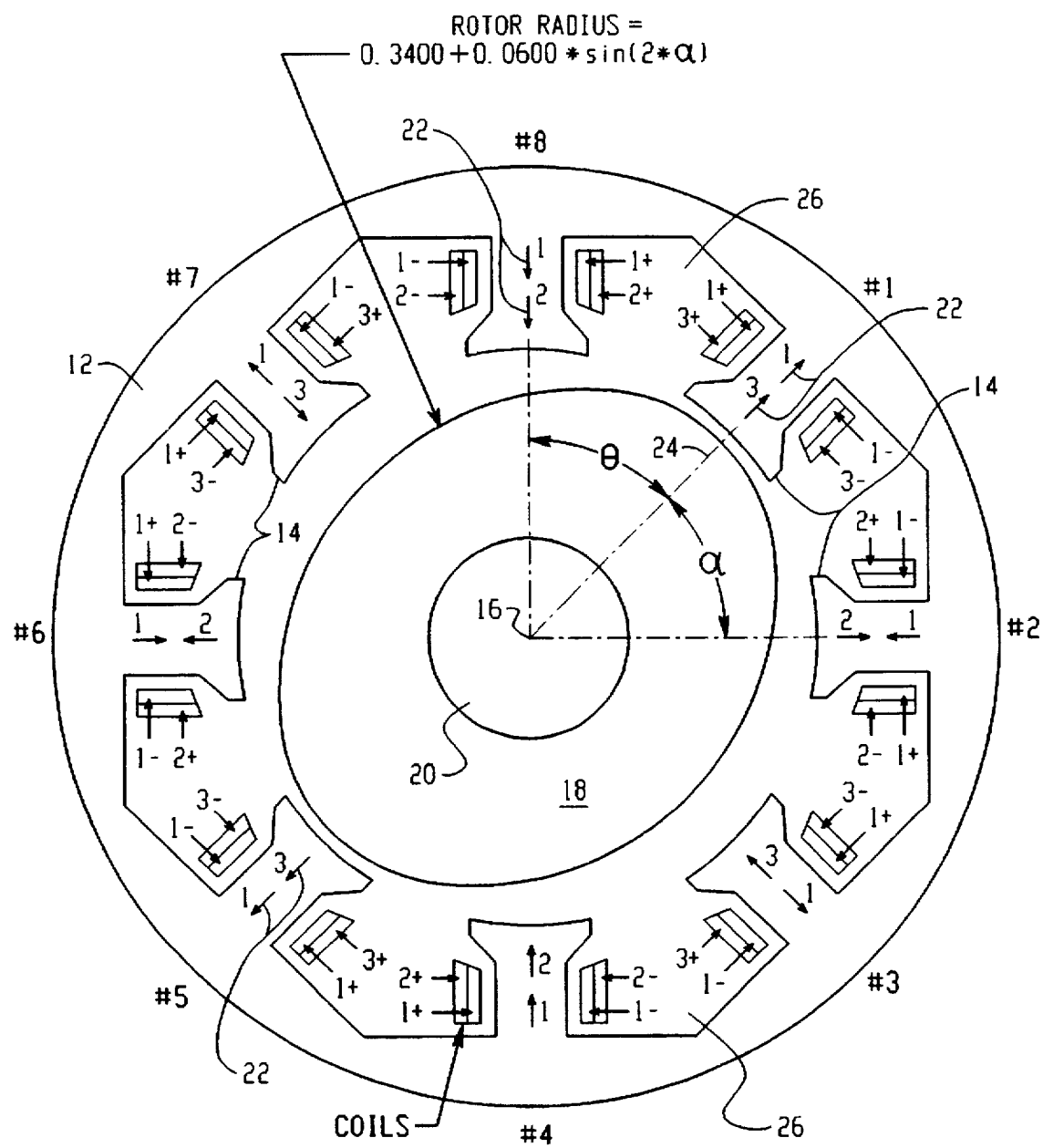
FIG. 1 is a simplified end plan view of -a conventional stator wound resolver.

With reference to FIG. 1, a typical stator wound resolver 10 includes a cylindrical body having a back iron or yoke 12 and a plurality of stator teeth 14. In this case there are eight stator teeth 14, projecting radially inward from the back iron towards the longitudinal axis 16 of the resolver. In FIG. 1, the longitudinal axis extends vertically through the plane of the drawing. The longitudinal axis 16 is also the rotational axis of a concentrically disposed rotor 18. The rotor 18 is mounted on a shaft 20 that is supported on bearings (not shown). The shaft 20 can be coupled or connected to another shaft or drive means that rotates the rotor. By rotation is meant any degree of rotation from 0° through 360° in either a step-wise, continuous, clockwise and/or counter-clockwise fashion. Resolvers can also be used, of course, for rotational speed determination.

The conventional stator wound resolver illustrated in FIG. 1 further includes a plurality of windings disposed on the stator teeth 14. In this case, there are three windings which are identified in the drawings as windings #1, #2 and #3 (in addition, each winding has a corresponding electrical phase associated with it, and for convenience the phases are given corresponding phase numbers, i.e. phase #1, phase #2 and phase #3). Each winding consists of a plurality of coils disposed on one or more of the stator teeth or poles 14. For convenience of reference and ease of explanation, each stator tooth in FIG. 1 is assigned a number 1 through 8, with tooth eight corresponding to the twelve o'clock position for the representation of FIG. 1.

Winding #1, for example, has a coil disposed on each stator tooth 14. Each side of a coil is designated with a "+" or "−" sign with its associated winding number (#) to indicate the direction of current flow. For example, winding #1 has a coil wound onto tooth #8 such that current flows up from the right side of tooth eight, across the top of the tooth and down the left side of tooth 8 (as viewed in FIG. 1). Thus the "+" designates current flow up out of the plane of the drawing and "−" designates current flow down into the plane of the drawing. The winding and current flow representations are provided simply as an example, and correspond with the flux directions indicated by the arrows 22 with the associated winding number. These representations are provided to show one embodiment for a resolver such that the magnetic flux linkage between the various coils and windings produce the desired resolver output phases. These winding arrangements will vary depending on the particular resolver design, as will be apparent to those skilled in the art.

A basic resolver has three phases, with each phase being associated with one of the windings disposed on the stator. Each of the phases can be an input or an output depending on whether the resolver is being operated in a phase modulation mode or an amplitude modulation mode.

Each resolver phase has a resistance characteristic, a self-inductance characteristic, and a mutual inductance characteristic with the other phases. The self-inductance and mutual inductance characteristics of each phase are a function of the rotor position. The waveform or waveshape of the self-inductance and mutual inductance characteristics (in relation to rotor position, for example) are in part a function of the stator shape, the rotor shape, the air gap length and the winding configurations.

The basic resolver concept is to produce two electrical output phases that are mutually coupled to the input phase in a sinusoidal manner, and preferably ninety degrees out of phase with each other, such that one output phase corresponds to a sine function and the other output phase corresponds to a cosine function. The sine and cosine output functions (phases #2 and #3 herein) are derived, in the described example herein, from amplitude modulation of an excitation signal applied to the input phase winding (#1 in this case). By varying the mutual inductance between the input and output phases in a sinusoidal manner as a function of rotor position or rotor angular displacement, the output phases represent sine and cosine functions that can be processed in a conventional manner to determine the rotor angle with respect to a reference position.

For the standard two lobe rotor resolver illustrated in FIG. 1, several parameters can be specified so that standard resolver characteristics result, i.e. the resolver outputs will be fully modulated sine and cosine signals. For the two lobe rotor 18, define A to be the number of rotor lobes (in this case A=2). A will also be understood as the number of electrical degrees per mechanical degree, with an electrical cycle being defined as one rotor lobe cycle. A resolver rotor can have more than two lobes, with the upper limit being determined in part by manufacturing difficulty and cost. A one lobe resolver is also possible to construct; however, a counter balance weight may be needed for high-speed operation.

The rotor 18 outer radius at an angle "α" is equal to the rotor radius at "−α", or in other words, the rotor 18 is symmetric about the center of the rotor lobes. The angle α is defined as the angle from the peak of a lobe to some other point on the rotor periphery.

The stator slots 26 and poles 14 (of which there are eight each in this case) are substantially identical and the overall stator shape is symmetrical. In the simplest form of a resolver, the number of stator slots, defined as K, is four times the number of rotor lobes, or K=4A. In general, K=4JA, where J is some integer greater than or equal to 1. Other combinations are possible if more than two output phases spaced by 90° is desired. For example, if three output phases spaced by 120° is desired then, in general, K=6JA.

The stator winding #1 has two north/south pole pairs per rotor lobe, and the width of each north pole is the same as each south pole. The number of turns of wire for each north pole is the same as for each south pole. Thus, phase #1 creates a pole pattern of N-S-N-S which spans one rotor lobe cycle.

The stator winding #2 has one north/south pole pair per rotor lobe. The center of each north pole is displaced by 180°/A electrical degrees from the neighboring south poles; and the pole widths are equal. Thus, phase #2 creates a pole pattern of N-O-S-O where "O" represents a span which is neither a north or south pole. The width of the "O" region can be anything from zero stator poles to ((K/A)−2)/2, provided that such a number is an integer. In the case where J=1, however, it is desirable that the "O" region be equal in size to the north and south pole sizes.

The stator winding #3 is identical to winding #2, except that this winding is shifted in position on the stator by 90°/A electrical degrees from winding #2.

For purposes of the following analysis, given the aforementioned design characteristics of the conventional resolver 10, the rotor angle will be assumed to be zero when a rotor lobe is aligned such that the mutual inductance between phase #1 and phase #2 is zero; and the mutual coupling between phase #1 and phase #3 is a positive maximum coupling. This convention is chosen for convenience and ease of explanation to simplify the mathematical analysis; any other reference could be selected, but the relevant transfer functions will include corresponding phase shifts. In FIG. 1, the rotor reference position is taken (and shown) for $\theta=0°$.

Under the design criteria set forth above for the conventional resolver of FIG. 1, the self-inductance and mutual inductance characteristics of each phase can be mathematically defined as set forth below. For this analysis, the rotor shape is such that the rotor radius equals a constant plus a sine term $[R=C+X\sin(A\theta)]$. The general characteristic equations for the phase inductances and mutual inductances can be rationalized by assuming the functions are mirror symmetric about their maximum or minimum points. However, a finite element analysis or empirical data can be used to verify the equations' form.

The characteristic equations are generalized—specific coefficients will depend on the particular dimensions of the resolver components. This analysis is provided as background for an understanding of how the invention improves resolver accuracy, therefore, specific coefficients derived are not critical to an understanding of and practice of the invention. It is noted, however, that conventional finite element analysis techniques known to those skilled in the art can be conveniently used.

Because the rotor contour is defined by a mirror symmetrical shape function, the self-inductance of phase #1 can be defined as follows:

$$L_1(\theta)=L_1^{0th}+L_1^{2nd}\cos(2\kappa A\theta)+L_1^{4th}\cos(4\kappa A\theta)+L_1^{6th}\cos(6\kappa A\theta)+ \quad Eq. (1)$$

in which the self-inductance includes a D.C. level, $L_1^{0th}$, and Fourier series even harmonics.

Note for the various equations herein that:

TABLE I $L_n$ is the inductance of phase n. Note: $L_2^{0th}=L_3^{0th}$, $L_2^{2nd}=L_3^{2nd}$ $M_{nm}$ is the mutual coupling between phase n and m. Note: $M_{12}^{0th}=L_{13}^{0th}$, $M_{12}^{1st}=M_{13}^{1st}$ A is the number of rotor lobes on the resolver.

$\theta$ is the relative mechanical angle between the rotor and the stator.

$\theta=0$ for the rotor position in FIG. 1.

$\kappa$ is the number of north/south pole pairs per lobe; for phase #1, K=2.

The L and M superscripts are the harmonic numbers.

The L and M subscripts are the phase numbers.

The self-inductances of phases #2 and #3 can similarly be defined as follows:

$$L_2(\theta) = L_2^{0th} + L_2^{2nd}\cos(2A\theta) + L_2^{4th}\cos(4A\theta) + \ldots \quad \text{Eqs. (2) and (3)}$$

$$L_3(\theta) = L_3^{0th} + L_3^{2nd}\cos(2A\theta) + L_3^{4th}\cos(4A\theta) - \ldots$$

The mutual inductance coupling between phases #1 and #2 ($M_{12}$), and the mutual coupling between phases #1 and #3 ($M_{13}$), have Fourier series higher harmonics are the odd harmonics only. In general, the mutual coupling between the primaries and secondaries should not contain a constant DC level. However, such characteristics as a non-concentric rotor, out of round stator, or non-uniform winding placement can cause a constant mutual coupling term. This constant term will contribute to the overall resolver error. The mutual inductances can be defined generally as follows:

$$M_{12}(\theta) = M_{12}^{0th} + M_{12}^{1st}\sin(A\theta) + M_{12}^{3rd}\sin(3A\theta) + M_{12}^{5th}\sin(5A\theta) + \ldots \quad \text{Eqs. (4) and (5)}$$

$$M_{13}(\theta) = M_{13}^{0th} + M_{13}^{1st}\cos(A\theta) - M_{13}^{3rd}\cos(3A\theta) + M_{13}^{5th}\cos(5A\theta) - \ldots$$

Note that, as expected, $M_{12}$ and $M_{13}$ are out of phase by 90°/A electrical degrees. The even harmonics are not present given the assumption that the mutual coupling functions are mirror symmetric.

Figure 2:
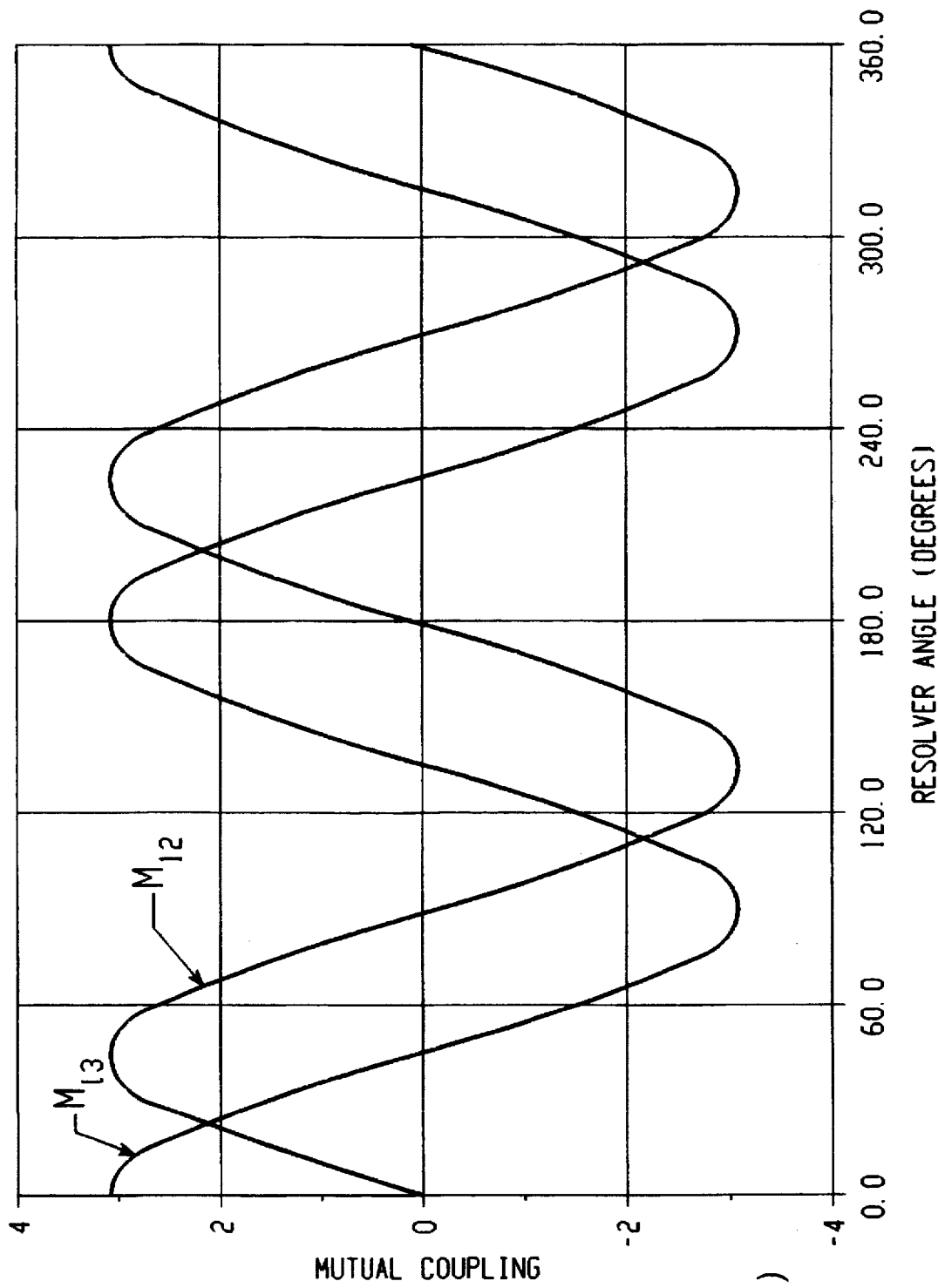
FIG. 2 is a representative graph based on empirical data of mutual coupling between the input and output windings of a resolver of the shape depicted in FIG. 1.

FIG. 2 shows representative plots of the values of $M_{12}$ and $M_{13}$ versus rotor position. This plot was derived from empirical data obtained from a resolver of the shape given in FIG. 1. Note that if we assume that the $M_{12}$ and $M_{13}$ functions are sine and cosine, a calculation of the arc tangent of the ratio will provide a value for the rotor angle $\theta$.

If one assumes that the input winding is winding #1 and an excitation signal $V_1=V_{in}\sin(\omega t)$ is applied thereto, then the open circuit (no load) output voltages of the output windings #2 and #3 can be predicted using simple circuit analysis:

$$V_2=\omega M_{12}i_{in}\cos(\omega t+k) \quad Eq. 6$$

$$V_3=\omega M_{13}i_{in}\cos(\omega t+k) \quad Eq. 7$$

In the resolver amplitude modulation mode the rotor position is determined by performing an inverse tangent function on the quotient of the demodulated amplitude of the two output signals, $V_2$ and $V_3$:

$$\theta_c=\tan^{-1}(M_{12}/M_{13}) \quad Eq. 8$$

The parameter $\theta_c$ will be defined as the calculated angle of the rotor, as opposed to the actual rotor position $\theta$. The difference between the calculated and the actual rotor position will be called the resolver error (Er) as shown in equations (9).

$$Er=\theta_c-A\theta \quad Eq. 9$$

Figure 3:
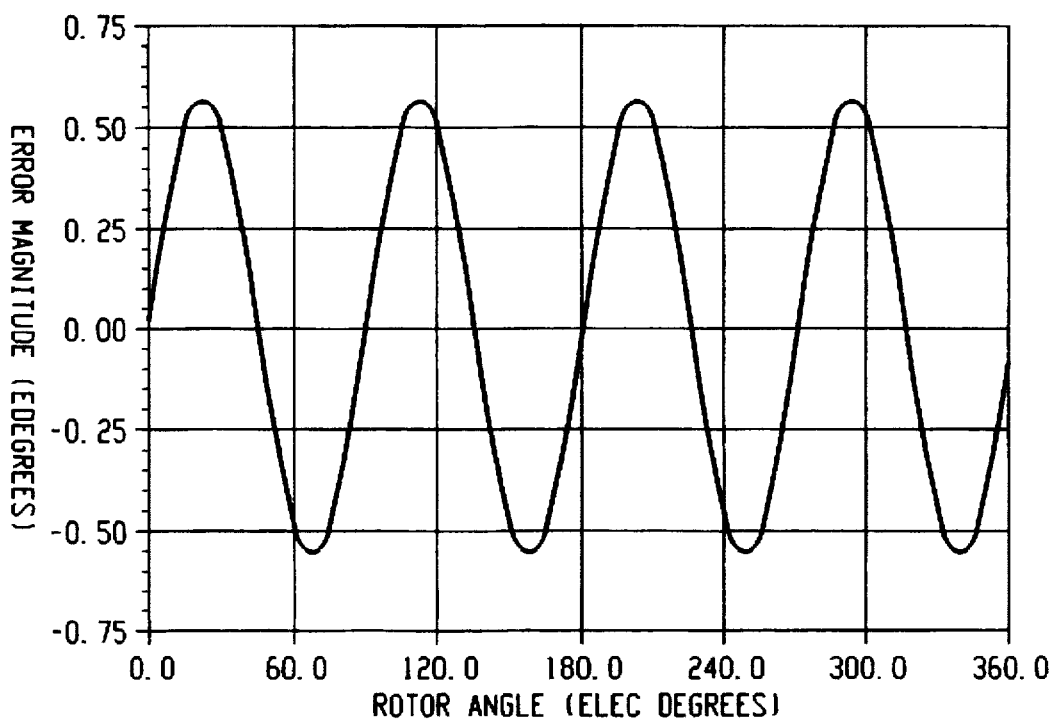
FIG. 3 is a representative graph of resolver error magnitude in electrical degrees versus rotor angle due to harmonic distortion, typical for a resolver such as shown in FIG. 1.

Equations 4 and 5 are the general representation of the mutual coupling of the output phases #2 and #3 with the input phase #1 (for the described embodiment). Because these mutual couplings contain higher harmonics, the rotor angle calculated by the inverse tangent function will not be a true angle measurement. There will exist a periodic error that is a function of the higher harmonic content of these mutual coupling functions. FIG. 3 shows in a representative manner the periodic nature of this error, in relation to rotor position, for a 1% third harmonic in the mutual coupling. If the mutual coupling were a pure sinusoid (i.e. no higher harmonics, only sin(Aθ) terms), then the inverse tangent function would simply be "Aθ". Such pure sinusoidal couplings, however, are difficult to achieve (as discussed with respect to the efforts of others). The present invention is directed to methods and apparatus for reducing these harmonic contributions in the mutual couplings.

In many cases, the principal component of error in the resolver readings can be attributed to a specific harmonic contribution. For example, for the resolver illustrated in FIG. 1, the most common and substantial error is a fourth electrical harmonic position error, which is caused by the third and fifth harmonics in the mutual coupling. For example, a 1% third harmonic can cause a 0.57 electrical degree error in the calculated rotor position (this is the phenomenon represented in FIG. 3). However, a 1% fifth harmonic also causes a 0.57 electrical degrees error that is in phase with the error induced by the third harmonic. These error magnitudes can be verified by evaluation of equations 8 and 9 while using the appropriate values for the higher harmonics in equations 4 and 5.

Figure 4:
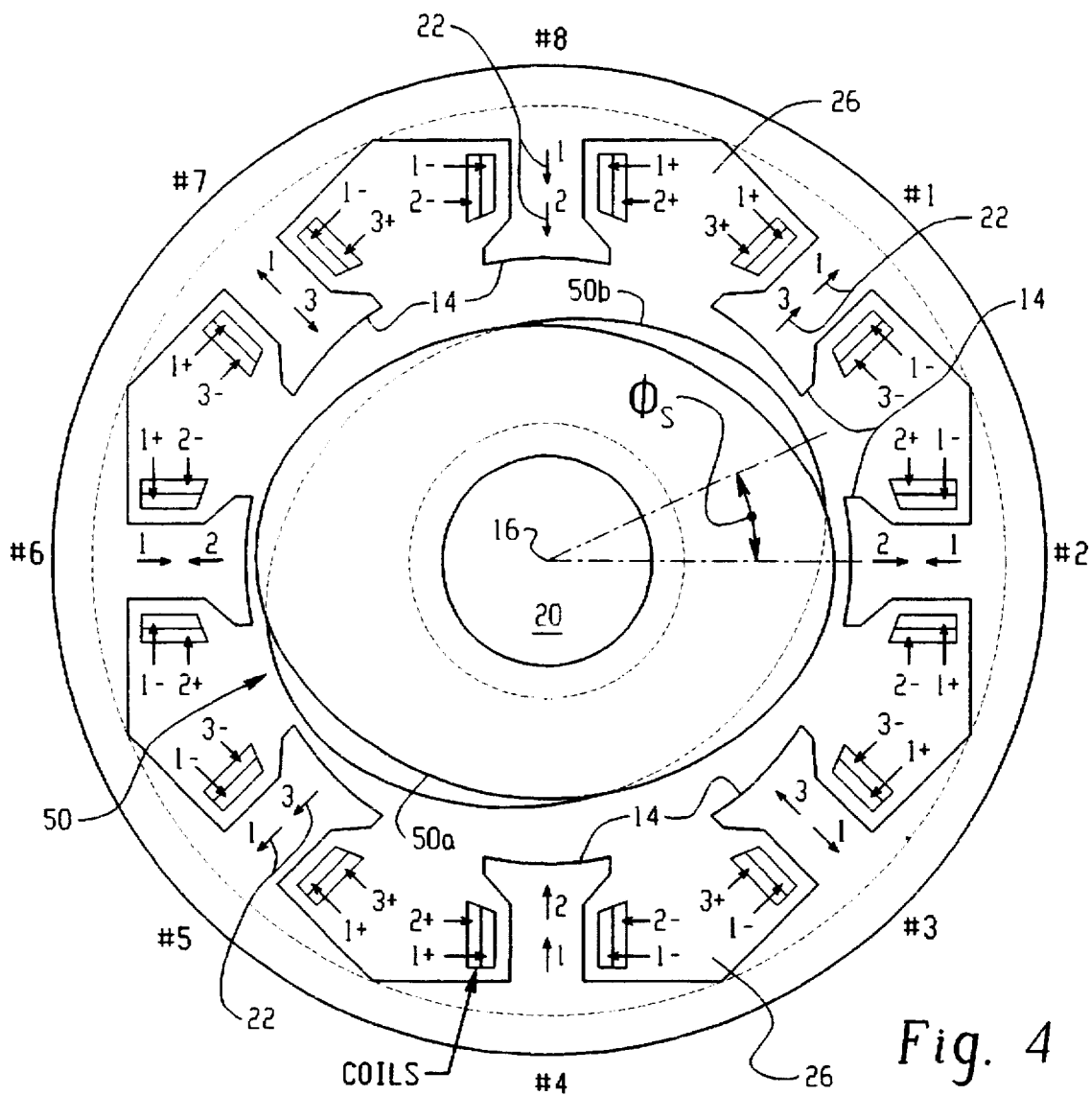
FIG. 4 is a simplified end plan view of a stator wound resolver that embodies the present invention.

With reference now to FIG. 4, there is illustrated in a manner similar to FIG. 1, a resolver that embodies the present invention. While the invention is described herein with specific reference to use of a stator wound resolver to determine discrete angular displacement, those skilled in the art will readily appreciate that the invention can be used in stator wound resolvers for other applications as well. Furthermore, while the invention is described herein with respect to a resolver operating in an amplitude modulation mode, such description is exemplary and should not be construed in a limiting sense. The present invention can conveniently be used with amplitude or phase modulation resolvers. The invention is also not limited to the use of one input phase and two output windings type resolvers, as described herein. Additional windings can be used as is known. The present invention is more directed to the method and apparatus associated with harmonic reduction by use of a rotor stagger concept, rather than the particulars of this exemplary resolver design, application and use, and especially the particulars of the structural characteristics of the described rotor, stator and associated windings.

According to an important aspect of the invention, a staggered rotor design is used to cause cancellation or substantial reduction in the fourth harmonic position error, for example. According to another important aspect of the invention, the staggered rotor design can be used with generally any rotor contour.

In FIG. 4, the components and basic design of the stator, including the back iron, teeth, windings and so forth, can be the same as the stator of FIG. 1 (assuming the same design criteria—the stator design is determined by the particular application in combination with the rotor). Therefore, except as otherwise noted herein, the description of the stator will not be repeated herein, and like reference numerals are used for the various elements.

The rotor 50, however, has significant differences from the rotor depicted in FIG. 1. The staggered rotor 50 in FIG. 4 is an isolated stagger design. An isolated stagger is realized, for example, by dividing the contoured ferromagnetic portion of the rotor in a direction perpendicular to the rotational axis into two equal thickness pieces, 50a and 50b. The word "dividing" is not meant to necessarily imply a cutting process. Dividing the rotor into two equal pieces is the preferred mode of operation for the invention; however, an unequal division, for example 60%–40% can be made to work. The rotor pieces can easily be built up as separate laminated structures, which if put together would produce a conventional single piece rotor of FIG. 1.

Figure 5:
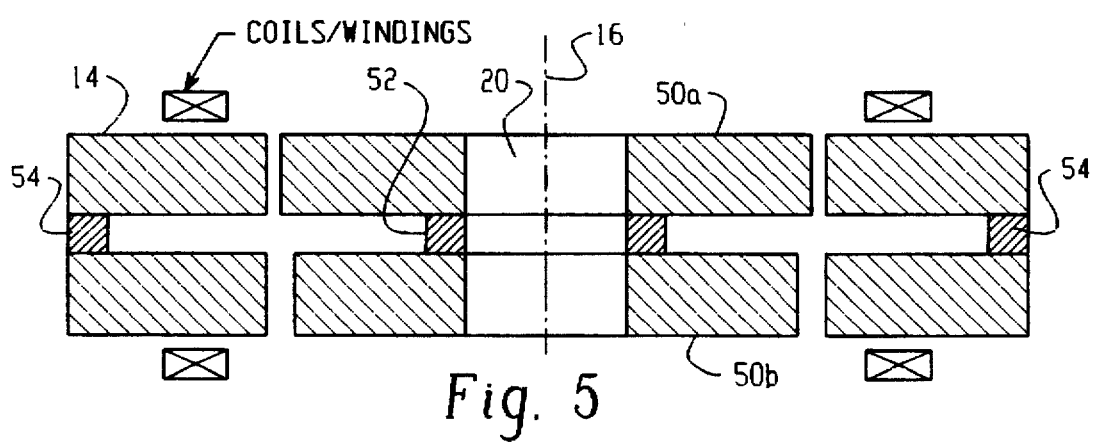
FIG. 5 is a cross-sectional view of the resolver of FIG. 4.

As best shown in FIG. 5, the rotor pieces are magnetically isolated from each other by a non-magnetic spacer 52. The spacer may be made of any suitable material, such as aluminum, for example. The spacer can be adhesively bonded to the rotor pieces, or can be attached by any other suitable means. Fasteners or other suitable means to hold the rotor pieces together (not shown) could also be used if appropriate for a particular application.

The rotor pieces 50a and 50b are substantially identical in contour and angularly displaced with respect to one another, and fixed in an unaligned position as illustrated in an exemplary manner in FIG. 4. The relative angle between the two rotor pieces is referred to herein as the stagger angle, $\phi_s$.

FIG. 5 illustrates the placement of the rotor isolation ring 52 and a stator isolation ring 54. I have found that, in some applications, if the stator is also separated into two isolated halves by a stator spacer 54, performance can be improved. The use of an isolated stator is not required, however, and as will be explained later herein, an isolated rotor is also not required in all cases. If the isolated stator approach is used, the stator laminated structure should also be magnetically isolated from any ferromagnetic casing that the resolver may be placed in. The isolated resolver halves improve harmonic cancellation in some cases apparently due to reducing substantially the amount of flux that can flow in the axial direction.

By staggering the rotor 50 pieces, the mutual coupling functions, defined generally by equations (4) and (5), are modified as shown in equations (10) and (11).

$$M_{12}(\theta, \phi_s) = 1/2 M_{12}(\theta - 1/2\phi_s) + 1/2 M_{12}(\theta + 1/2\phi_s) \qquad \text{Eqs. 10 and 11}$$

$$M_{13}(\theta, \phi_s) = 1/2 M_{13}(\theta - 1/2\phi_s) + 1/2 M_{13}(\theta + 1/2\phi_s)$$

In Eq. 10, $M_{12}(\theta - \frac{1}{2}\phi_s)$, for example, denotes replacing θ in equation (4) with $\theta - \frac{1}{2}\phi_s$.

If Eq. 9 is evaluated, in keeping with previous examples herein, using the expanded mutual coupling equations 10 and 11 (thereby including the harmonic contributions and the stagger angle effects), the magnitude of the fourth harmonic resolver electrical degree error can be determined for various stagger angles from 0° to 180°. Such an analysis is graphically represented in FIG. 6 assuming a 1% third harmonic in the mutual coupling. It will be noted that the fourth harmonic error magnitude is essentially reduced to zero at a stagger angle of approximately 60 electrical degrees. Similar results obtain for a −1% third harmonic, except that the error values would need to be multiplied by −1.

Figure 7:
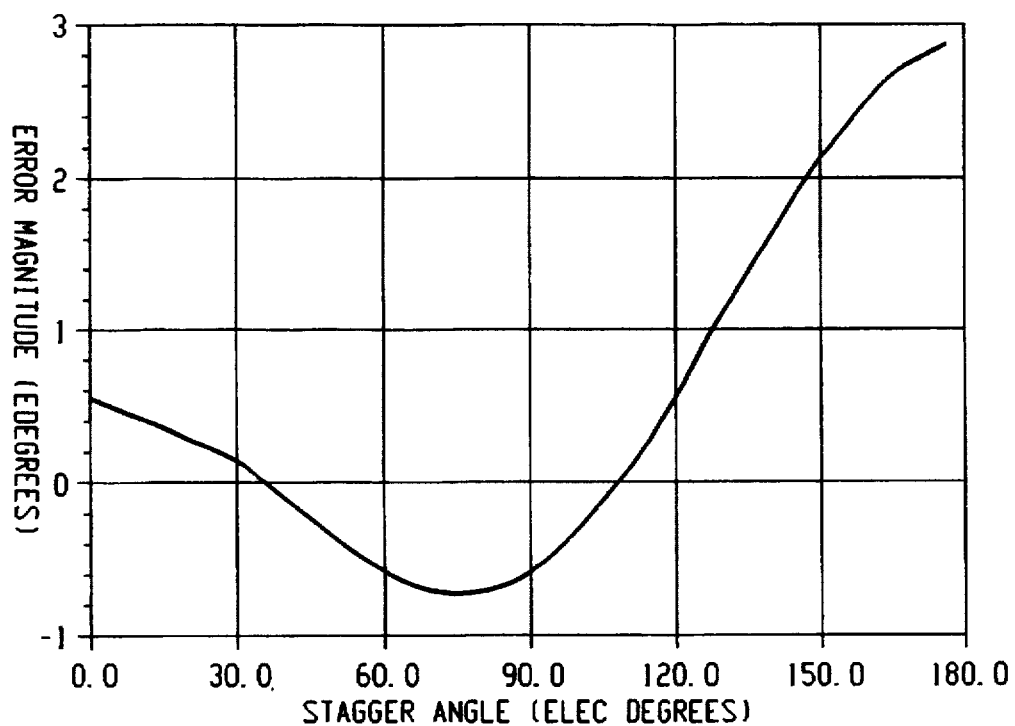
FIG. 7 is a representative graph of resolver error magnitude in electrical degrees versus stagger angle due to a fifth mutual coupling harmonic.

A similar analysis for the fourth harmonic error caused by a 1% fifth harmonic in the mutual coupling can be performed and the result is shown in FIG. 7. In this case, a 36 electrical degree stagger angle produces a zero fourth harmonic error. It is worth special note that, although in an unstaggered design, the fourth harmonic errors caused by a 1% third or fifth mutual coupling are equal in magnitude, the same is not true when the stagger angle does not equal zero. However, the phase of the fourth harmonic error is independent of the stagger angle.

It will be further noted at this time, that the example herein of the fourth harmonic error caused by the third and fifth mutual coupling harmonics is but one example of the types of harmonics that can be effectively canceled by use of the present invention. This specific example should not be construed in a limiting sense as to the different harmonic errors that can be reduced or eliminated. Use of the invention for other harmonic components is a straightforward matter of following the same mathematical and empirical analysis of the present invention described herein with respect to this specific example.

Although the analysis of Eq. 9 shows that different stagger angles can reduce the fourth harmonic error caused by the third and fifth mutual coupling harmonics, there is no single stagger angle where both error magnitudes caused by the third and fifth harmonic are zero. However, there does exist a stagger angle where the fourth harmonic error caused by the third mutual harmonic is equal in magnitude but opposite in sign (i.e. out of phase) with the fourth harmonic error caused by the fifth mutual coupling harmonic. This arises from several empirical and mathematical observations. First, the phase of the fourth harmonic error is independent of the stagger angle. The phase of the fourth harmonic error is independent of the mutual harmonic that created it. The magnitude of the error vs. stagger angle curve is directly proportional (as long as $M^{1st} >> M^{3rd}$ and $M^{1st} >> M^{5th}$ ...) to the magnitude of the mutual coupling harmonics that created it. The error vs. stagger angle curve for any arbitrary combination of third and fifth mutual harmonics will be a linear combination of the individual error vs. stagger angle curves (such as FIG. 6 and FIG. 7 for example). Also, the mutual coupling harmonics greater than the fifth harmonic, such as the seventh harmonic, do not create fourth harmonic errors.

In order to determine the optimum stagger angle for reducing the fourth harmonic error from both the third and fifth mutual harmonics, empirical data is also needed.

In this example, we assume that a resolver exists that contains a fourth harmonic error. It is possible to measure, experimentally, the magnitude of the fourth harmonic in the resolver error for two different stagger angles and use this information to calculate the optimum stagger angle. One of the stagger angle values, used during the experimental data taking, could be $\phi=0$, however, for the sake of being as general as possible, the analysis below will assume that data was taken for two different nonzero values of stagger. In the following analysis some notation will be used; this notation is defined as follows:

$Q_\alpha$=The measured fourth harmonic error magnitude at a stagger angle of $\alpha$.
$Q_\eta$=The measured fourth harmonic error magnitude at a stagger angle of $\eta$.
$Q_\alpha^{3rd}$=The fourth harmonic error at a stagger angle of $\alpha$, due to the 3rd mutual harmonic only.
$Q_\eta^{5th}$=The fourth harmonic error at a stagger angle of $\eta$, due to the 5th mutual harmonic only.
$Q_0^{3rd}$=The fourth harmonic error at a stagger angle of 0, due to the 3rd mutual harmonic only.
$Q_0^{5th}$=The fourth harmonic error at a stagger angle of 0, due to the 5th mutual harmonic only.
$\psi_\alpha^{3rd}=Q_\alpha^{3rd}/Q_0^{3rd}$=Third harmonic "transfer" factor at the stagger angle of $\alpha$.
$\psi_\alpha^{5th}=Q_\alpha^{5th}/Q_0^{5th}$=Fifth harmonic "transfer" factor at the stagger angle of $\alpha$.
$\lambda^{3rd}=M_{Lx}^{3rd}/Q_\eta^{3rd}$=Third harmonic "scale" factor at the stagger angle of $\alpha$.
$\lambda^{5th}=M_{Lx}^{5th}/Q_0^{5th}$=Fifth harmonic "scale" factor at the stagger angle of $\eta$.

An Equation can be written that equates the magnitude of the fourth harmonic error at a specific stagger angle to the sum of the "transferred" error magnitudes due to the 3rd mutual harmonic at zero stagger, with the transferred error magnitude due to the 5th mutual harmonic at zero stagger.

The equation is applied to two different stagger angles and the results shown as Equations (12) and (13). These equations can be written because the magnitude of the error versus stagger angle function is proportional to the mutual harmonic magnitude; the shape of the function does not change. Thus, if the mutual harmonic error is known at a specific stagger angle it is also known at all other stagger angles.

$$Q_\alpha = \psi_\alpha^{3rd} Q_0^{3rd} + \psi_\alpha^{5th} Q_0^{5th} \quad Eq.\ (12)$$

$$Q_\eta = \psi_\eta^{3rd} Q_0^{3rd} + \psi_\eta^{5th} Q_0^{5th} \quad Eq.\ (13)$$

Equations (12) and (13) can be written in matrix form as shown Equation (14).

$$\begin{bmatrix} Q_\alpha \\ Q_\eta \end{bmatrix} = \begin{bmatrix} \psi_\alpha^{3rd} & \psi_\alpha^{5th} \\ \psi_\eta^{3rd} & \psi_\eta^{5th} \end{bmatrix} \begin{bmatrix} Q_0^{3rd} \\ Q_0^{5th} \end{bmatrix} \quad Eq.\ (14)$$

Solving for $Q_0^{3rd}$ and $Q_0^{5th}$ leads to Equation (15) and (16).

$$Q_0^{3rd} = \frac{\psi_\eta^{5th} Q_\alpha - \psi_\alpha^{5th} Q_\eta}{\psi_\eta^{5th} \psi_\alpha^{3rd} - \psi_\eta^{3rd} \psi_\alpha^{5th}} \quad Eq.\ (15)$$

$$Q_0^{5th} = \frac{\psi_\alpha^{3rd} Q_\eta - \psi_\eta^{3rd} Q_\alpha}{\psi_\eta^{5th} \psi_\alpha^{3rd} - \psi_\eta^{3rd} \psi_\alpha^{5th}} \quad Eq.\ (16)$$

Using Equations (15) and (16) the 4th harmonic error due to the third and fifth mutual harmonic, respectively, can be calculated from experimental measurements. Thus, one can calculate the original magnitude of the third and fifth mutual harmonic by using Equations (17) and (18). The "scaling" factors, i.e., $\lambda^{3rd}$ and $\lambda^{5th}$, between the fourth harmonic error magnitude and the mutual coupling harmonic magnitude was calculated by a "resolver simulation" (i.e., evaluation of equations 8, 9, 10 and 11 or graphically from FIGS. 6 and 7).

$$M_{Lx}^{3rd} = \lambda^{3rd} A_0^{3rd} \quad Eq.\ (17)$$

$$M_{Lx}^{5th} = \lambda^{5th} Q_0^{5th} \quad Eq.\ (18)$$

$Q_\alpha$ and $Q_\eta$ can be experimentally measured for the stator wound resolver. Let's assume this data has been taken and the magnitude of the fourth harmonic at the two different stagger angles is as shown below (note $\alpha=27°$ and $\eta=66°$):

$$Q_{27} = -0.335305\ electrical\ degrees \quad Eq.\ (19)$$

$$Q_{66} = -0.223003\ electrical\ degrees \quad Eq.\ (20)$$

The values of $\psi_\alpha^{3rd}$, $\psi_\alpha^{5th}$, $\psi_\eta^{3rd}$, $\psi_\eta^{5th}$, $\lambda^{3rd}$, and $\lambda^{5th}$ can be calculated from the resolver simulation. The value of these parameters have been calculated as shown below.

$$\psi_{27}^{3rd} = 0.447937/0.572773 = 0.782050 \quad Eq.\ (21)$$

$$\psi_{66}^{3rd} = -0.106854/0.572773 = -0.186556 \quad Eq.\ (22)$$

$$\psi_{27}^{5th} = -0.225474/0.572773 = 0.393653 \quad Eq.\ (23)$$

$$\psi_{66}^{5th} = -0.659646/0.572773 = -0.151671 \quad Eq.\ (24)$$

$$\lambda^{3rd} = \lambda^{5th} = 1\%/0.572773 = 1.745892 \quad Eq.\ (25)$$

The measured parameters in Equations (19) and (20) can be combined with the calculated parameters in Equations (21) through (25), and used to evaluate Equations (15) through (18). The result will be values for $M_{Lx}^{3rd}$ and $M_{Lx}^{5th}$ for the mutual coupling harmonic; the calculated values of $M_{Lx}^{3rd}$ and $M_{Lx}^{5th}$ for the present example are given below.

$$M_{1x}{}^{3rd} = -1.000283\% \qquad Eq. (26)$$

$$M_{1x}{}^{5th} = +0.500098\% \qquad Eq. (27)$$

The values of $M_{1x}{}^{3rd}$ and $M_{1x}{}^{5th}$ given in Equations (26) and (27) can be resubmitted to the simulation program in order to determine the optimum stagger angle for the given amount of third and fifth mutual harmonic content. The resulting error versus stagger angle curve is given in FIG. 8. Notice that at a stagger angle of 27° and 66° the fourth harmonic magnitude is as it should be—consistent with the "experimental" error measurements of Equations (19) and (20). This has happened because the outlined procedure has found an error versus stagger angle curve that matches the two specified points and is a linear combination of FIGS. 6 and 7. The optimum stagger angle for the present example is 79 electrical degrees; at this stagger angle the fourth harmonic error due to the third mutual coupling will cancel the error due to the fifth mutual harmonic.

Thus, a stator wound resolver with an isolated stagger can be constructed such that the fourth harmonic error due to the third and the fifth mutual coupling harmonics is nearly zero. Since the fourth harmonic error is the most pronounced error in the exemplary resolver described herein, the isolated stagger offers substantial accuracy improvement. The optimum stagger angle for a stator wound resolver will be different among different resolver designs, i.e., different stator and/or rotor shapes. However, for a given design there will exist a stagger angle for which the fourth harmonic error undergoes substantial cancellation. A logical process of steps exists, as described, which one can undergo in order to determine the optimum stagger angle for a given resolver design.

Figure 8:
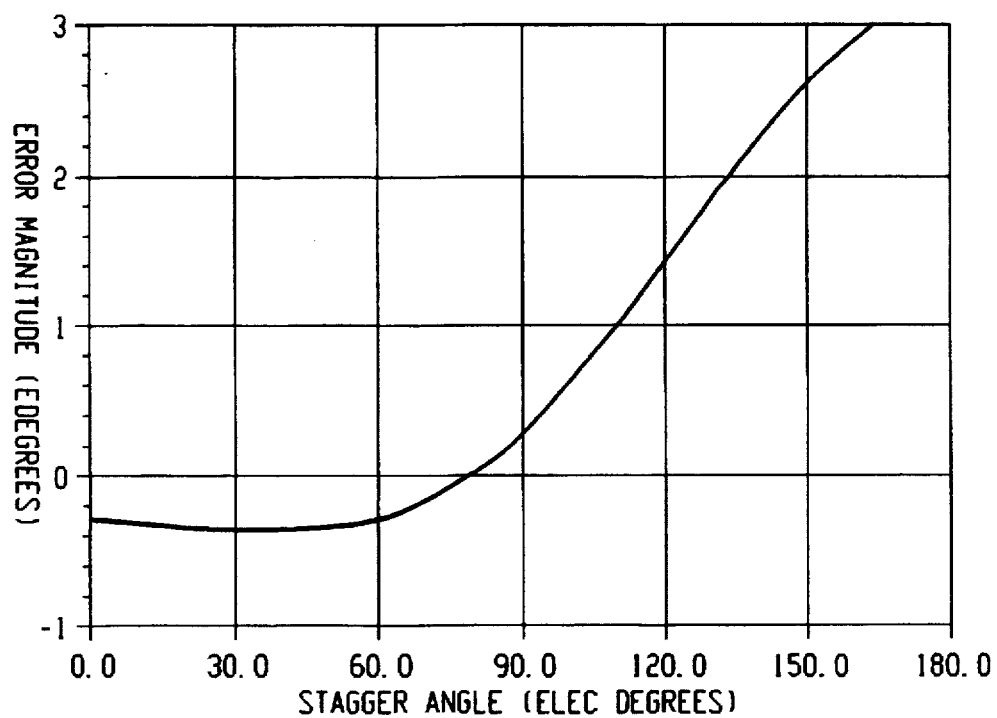
FIG. 8 is a representative graph of resolver error magnitude in electrical degrees versus stagger angle due to a third and a fifth mutual coupling harmonic error.
Figure 6:
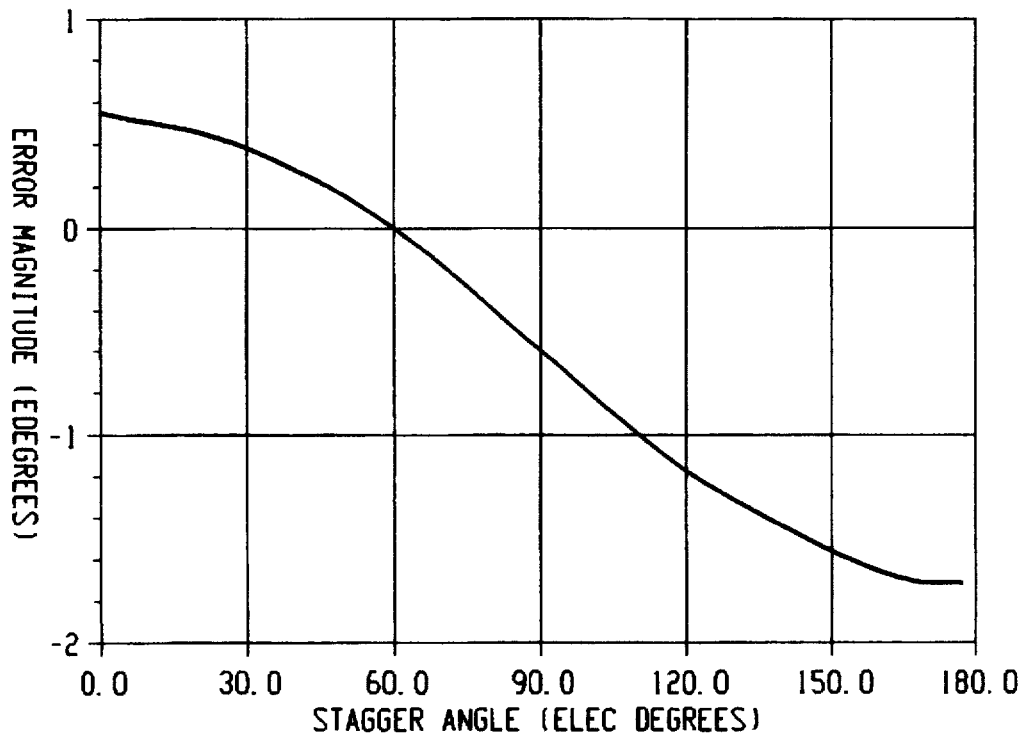
FIG. 6 is a representative graph of resolver error magnitude in electrical degrees versus stagger angle due to a third harmonic in the mutual coupling functions.

The optimum stagger angle can also be determined without the use of the presented equations by empirically creating a fourth harmonic error magnitude versus stagger angle plot similar to what is shown in FIGS. 6, 7 and 8. However, this method requires many error plots to be measured at many different stagger angles.

It is noted that the seventh and ninth mutual harmonics can also affect the resolver error. In general, the seventh and the ninth electrical harmonics cause an eighth electrical harmonic in the resolver error, and the seventh and the ninth mutual harmonics are much smaller than the third and fifth. As a result, they can be neglected in most cases. However, if the seventh and ninth mutual harmonic are significant, it is possible to apply the same isolated stagger cancellation technique to these harmonics; the result will be a multilayer staggered rotor resolver.

The invention thus provides methods and apparatus for reducing harmonic error in a stator wound resolver. The particular technique employed according to the teachings of the invention will depend on the resolver application and the amount of error reduction desired.

While the invention has been shown and described with respect to specific embodiments thereof, this is for the purpose of illustration rather than limitation, and other variations and modifications of the specific embodiments herein shown and described will be apparent to those skilled in the art within the intended spirit and scope of the invention as set forth in the appended claims.

I claim:

1. A stator wound resolver comprising: a stator and a rotor aligned on an axis; said stator having a plurality of teeth with input and output windings disposed on a number of said teeth, said input and output windings exhibiting a mutual inductance characteristic that varies as a function of position of the rotor about said axis; said input winding being connectable to a drive signal and said output windings being disposed on said teeth such that output signals induced in said output windings correspond to position of the rotor; said rotor being attachable to a position changing means, said rotor comprising at least two axially spaced rotor pieces that are offset from each other by a stagger angle; said stagger angle being based on at least two magnitude measurements of mutual inductance harmonic distortion, each said measurement being taken using a different stagger angle, wherein said rotor pieces are offset at an optimum stagger angle at which two components of mutual inductance harmonic distortion substantially cancel each other to reduce distortion in the resolver output signals.

2. The resolver of claim 1 wherein said rotor pieces are magnetically isolated from each other.

3. The resolver of claim 2 wherein said rotor pieces are axially separated by a non-magnetic spacer and have substantially identical contours, and further wherein the stator comprises two halves that are magnetically isolated from each other.

4. The resolver of claim 3 wherein said rotor pieces are magnetically isolated from said position changing means.

5. The resolver of claim 1 wherein said stagger angle is selected so as to reduce fourth electrical harmonics in said output signals caused by third and fifth electrical harmonic components of mutual inductance between the input and output windings.

6. The resolver of claim 5 wherein said rotor comprises more than two pieces so that additional electrical harmonics are reduced in the output signals.

7. The resolver of claim 6 wherein said rotor pieces are formed with a contour having a contour radius defined by a sinusoidal function so that mutual inductance between said input and output windings varies with position of the rotor in a sinusoidal manner.

8. The resolver of claim 1 wherein said stator comprises eight pole teeth, said input winding having electrically common coil sections wound on each pole; said stator further comprising two output windings, a first output winding having four coil sections with each coil section being wound on a respective pole, and a second output winding having four coil sections with each coil section being wound on a respective pole such that the output signal from said first output winding is ninety degrees out of phase with respect to the output signal from said second output winding.

9. The resolver of claim 8 wherein said first and second output windings are respectively wound in quadrature on different poles of the resolver.

10. The resolver of claim 9 wherein said rotor pieces each have two lobes so that one mechanical cycle of the rotor produces two electrical cycles in the output windings.

11. The resolver of claim 10 wherein each output winding produces an output signal that varies 360 electrical degrees in a sinusoidal manner for each 180 degrees of rotor rotation.

12. The resolver of claim 11 wherein mutual inductance between said input winding and each of said output windings exhibits odd harmonic distortions, wherein said mutual inductance odd harmonics cause even electrical harmonic distortions in said output signals.

13. The resolver of claim 12 wherein fourth harmonic electrical distortion corresponding to one of said rotor pieces reduces fourth harmonic electrical distortion corresponding to another of said rotor pieces.

14. A method for reducing harmonic distortion in the output signals of a stator wound resolver comprising the steps of:

a. using a first rotor that has a radius that varies in a sinusoidal manner to vary mutual inductance between input and output windings on the stator as a function of rotor position;

b. producing output signals from the resolver output windings as a function of said mutual inductance; and c. using a second rotor that is axially spaced from said first rotor and offset by an optimum stagger angle to produce complementary harmonic signals that reduce harmonic distortion in the resolver output signals; said optimum stagger angle being selected based on at least two magnitude measurements of mutual inductance harmonic distortion, each said measurement being taken using a different stagger angle.

15. In a stator wound resolver of the type having a rotor concentrically disposed within a stator, said stator having a plurality of teeth with input and output windings disposed on a number of said teeth, said input and output windings exhibiting a mutual inductance characteristic that varies as a function of position of the rotor about said axis, the improvement comprising said rotor having a number of axially spaced pieces that are offset from each other by a stagger angle with a portion of harmonic distortion produced by one of said rotor pieces being reduced by harmonic distortion produced by another of said rotor pieces; said rotor pieces being offset at an optimum stagger angle that is based on at least two magnitude measurements of mutual inductance harmonic distortion, each said measurement being taken using a different stagger angle.

16. The resolver of claim 15 wherein the stator comprises two axially spaced sections magnetically isolated from each other.

* * * * *

UNITED STATES PATENT AND TRADEMARK OFFICE
CERTIFICATE OF CORRECTION

PATENT NO. : 5,763,976
DATED : June 9, 1998
INVENTOR(S) : Steven R. Huard

It is certified that error appears in the above-identified patent and that said Letters Patent is hereby corrected as shown below:

Column 3, Line 3, please delete "-a" and insert -- a --.

Column 5, Line 51, Eq. (1), after "+" please insert -- ... --.

Column 5, Line 59, after "$L_3^{2nd}$", please add -- etc. --.

Column 6, Line 6, please delete "$L_2^{2and}$" and add -- $L_2^{2nd}$ --.

Column 6, Line 7, please delete "$+L_3^{2and}$" and add -- $-L_3^{2nd}$ --.

Column 9, Line 38, please delete "ø=0" and insert -- $ø_s=0$ --.

Column 10, Line 39, Eq. (17) please delete "$A_o^{3rd}$" and insert -- $Q_o^{3rd}$ --.

Column 12, Line 9, please delete "," after "angle".

Column 12, Line 40, please delete "." after "pole,".

Signed and Sealed this

Thirteenth Day of July, 1999

Attest:

Q. TODD DICKINSON

*Attesting Officer*   *Acting Commissioner of Patents and Trademarks*